(12) United States Patent
Farr et al.

(10) Patent No.: US 9,231,708 B2
(45) Date of Patent: Jan. 5, 2016

(54) OPTICAL COMMUNICATION SYSTEMS AND METHODS

(71) Applicant: Woods Hole Oceanographic Institution, Woods Hole, MA (US)

(72) Inventors: Norman E. Farr, Woods Hole, MA (US); Jonathan Ware, Mashpee, MA (US); Clifford T. Pontbriand, N. Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 0 days.

(21) Appl. No.: 14/557,361

(22) Filed: Dec. 1, 2014

(65) Prior Publication Data
US 2015/0132004 A1  May 14, 2015

Related U.S. Application Data

(63) Continuation-in-part of application No. 13/117,867, filed on May 27, 2011, now abandoned, which is a continuation of application No. 11/348,726, filed on Feb. 6, 2006, now Pat. No. 7,953,326, application No. 14/557,361, which is a continuation-in-part of application No. 13/344,430, filed on Jan. 5, 2012, now Pat. No. 8,953,944.

(60) Provisional application No. 61/430,081, filed on Jan. 5, 2011.

(51) Int. Cl.
*H04B 10/00* (2013.01)
*H04B 10/80* (2013.01)
*H04B 13/02* (2006.01)

(52) U.S. Cl.
CPC ............... *H04B 10/80* (2013.01); *H04B 13/02* (2013.01); *Y10T 29/49826* (2015.01)

(58) Field of Classification Search
CPC .. H04B 10/11; H04B 10/114; H04B 10/1141; H04B 10/1143; H04B 10/1149; H04B 10/116; H04B 10/80
USPC .................................................. 398/104, 105
See application file for complete search history.

(56) References Cited

U.S. PATENT DOCUMENTS

| | | | | |
|---|---|---|---|---|
| 2008/0310850 | A1* | 12/2008 | Pederson | G07C 9/00158 398/135 |
| 2010/0054748 | A1* | 3/2010 | Sato | H04B 10/116 398/130 |

* cited by examiner

*Primary Examiner* — Daniel Dobson
(74) *Attorney, Agent, or Firm* — Douglas Denninger

(57) ABSTRACT

A system and method to broadcast an optical signal through an amorphous medium, including a primary emitter capable of producing a primary optical signal during at least one broadcast period and capable of transmitting the primary optical signal through the amorphous medium. A secondary emitter, separate from the primary emitter and in operation during at least a portion of the broadcast period, produces a secondary emission detectable by a detector during the broadcast period. A signal entrainment controller, in communication with the primary emitter and the secondary emitter, synchronizes the secondary emitter with the primary emitter to generate a resultant signal of higher intensity than the primary signal by itself.

24 Claims, 6 Drawing Sheets

OPTICAL COMMUNICATION SYSTEMS AND METHODS

CROSS-REFERENCE TO RELATED APPLICATIONS

This application is a continuation-in-part of: (i) U.S. application Ser. No. 13/117,867 filed 27 May 2011, which is a continuation of U.S. application Ser. No. 11/348,726 filed 6 Feb. 2006, now U.S. Pat. No. 7,953,326; and (ii) U.S. application Ser. No. 13/344,430 filed 5 Jan. 2012, and claims priority to U.S. Provisional Application No. 61/430,081 filed 5 Jan. 2011. The entire contents of each of the above-mentioned applications are incorporated herein by reference.

FIELD OF THE INVENTION

This invention relates to systems and methods to enhance optical signal transmission that is subject to degradation by at least one secondary emission in an amorphous broadcast medium.

BACKGROUND OF THE INVENTION

Sensor-bearing unmanned underwater vehicles (UUV), as well as cabled ocean observatories, have been deployed extensively to study both natural and man-made phenomena. Much of the wireless communication necessary for these activities is accomplished by acoustic communication systems. Such acoustic communication systems, however, are limited by low band-width and high latency, and do not permit video or other high-rate data transfers.

Accordingly, improved underwater optical communication (opticom) systems have been developed such as those described by Fucile et al. in US Patent Publication No. 2005/0232638 and by Farr et al. in U.S. Pat. No. 7,953,326, the latter being incorporated herein by reference.

Opticom uses light instead of sound to carry information. An opticom system encodes a message into an optical signal, and then emits or transmits the optical signal through a channel or transmission medium to a receiver, which reproduces the message from the received optical signal. While opticom systems provide high-band-width, bidirectional wireless underwater optical communications, their performance is subject to interference from light generated from secondary light-producing systems deployed within the nearby marine environment. Such interfering secondary lighting systems may include work site lights, photographic lighting, navigational lighting, directional lights, hand-held lights, beacons, and/or warning lights.

It is therefore desirable to mitigate many typical light interference issues that would otherwise degrade optical communication signals in an amorphous medium such as water.

SUMMARY OF THE INVENTION

An object of the present invention is to reduce interference from secondary lighting systems to enhance optical communications in an amorphous medium of a gas such as air, of liquid such as water, or a vacuum.

Another object of the present invention is to improve a transmitted optical signal reaching a detector or receiver immersed in the amorphous medium.

This invention features a system that broadcasts an optical signal through an amorphous medium to a detector, also referred to as a receiver. The system includes a primary emitter capable of producing a primary optical signal having a first intensity during at least one broadcast period and capable of transmitting the primary optical signal through the amorphous medium. At least one secondary emitter is separate from the primary emitter, and is in operation during at least a portion of the broadcast period. The secondary emitter produces a secondary emission having a second intensity detectable by the detector during the broadcast period. A signal entrainment controller, in communication with the primary emitter and the secondary emitter, synchronizes the secondary emitter with the primary emitter to generate a resultant signal of higher intensity than the primary signal by itself.

In some embodiments, the controller modulates the second intensity of the secondary emitter in synchrony with the primary optical signal. In certain embodiments, the resultant signal is of higher intensity than either the intensities of the primary signal or the secondary signal alone. In one embodiment, the controller changes the timing of the secondary emission relative to primary emission, such as by delaying the emitter that is closer to the detector to achieve substantially simultaneous reception by the detector of both signals. In a number of embodiments, the secondary emitter is normally operated at a duty cycle of at least 50 percent, typically at least 75 to 100 percent, when activated. In one embodiment, the secondary emitter is at least one of a work site light, a light to illuminate a photographic subject, a light on a submersible vehicle, a hand-held light, and a beacon.

In some embodiments, the controller includes at least one of a multiplexer and a signal splitter. In certain embodiments, the system further includes at least one receiver such that the system is capable of bidirectional communication with a third, remote emitter. In one embodiment, the second emitter is suppressed when the receiver senses that the third emitter is transmitting.

This invention also features a method of broadcasting an optical signal through an amorphous broadcast medium, including selecting a primary emitter capable of producing a primary optical signal during at least one broadcast period, selecting a detector capable of detecting the primary signal within the broadcast medium, and selecting a secondary emitter separate from the primary emitter and being capable of producing a secondary emission detectable by the detector during the broadcast period. The method further includes producing a primary optical signal from the primary emitter during at least one broadcast period and transmitting the primary optical signal through the amorphous broadcast medium, and synchronizing the secondary emitter with the primary emitter to generate a resultant signal of higher intensity than the primary signal by itself.

This invention further features a method of converting a secondary emitter to enhance broadcasting of an optical signal through an amorphous medium to a detector capable of detecting the optical signal within the amorphous medium. The method includes selecting a primary emitter capable of producing a primary optical signal during at least one broadcast period, and selecting at least one secondary emitter separate from the primary emitter. The secondary emitter is normally operated at a duty cycle of at least 50 percent when activated and is capable of producing a secondary emission detectable by the detector during the broadcast period. The method further includes producing a primary optical signal from the primary emitter during at least one broadcast period and transmitting the primary optical signal through the amorphous medium, and synchronizing the secondary emitter with the primary emitter, to modify the duty cycle of the secondary emitter and generate a resultant signal of higher intensity than the primary signal by itself within the amorphous medium.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

Figure 1:
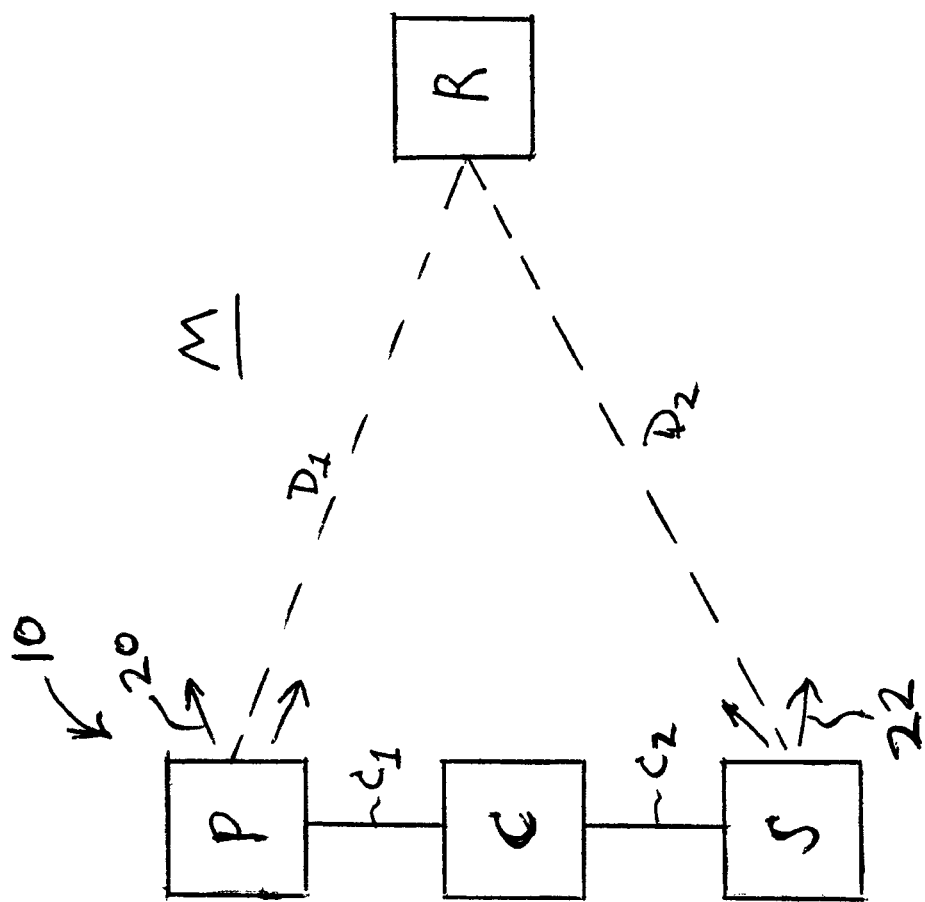
FIG. 1 is a schematic diagram of a system according to the invention immersed in an amorphous medium M and broadcasting to a receiver R.

This invention may be accomplished by a system and method including a primary emitter capable of producing a primary optical signal during at least one broadcast period and capable of transmitting the primary optical signal through an amorphous medium such as air, water, or a vacuum. A secondary emitter separate from the primary emitter, and in operation during at least a portion of the broadcast period, produces a secondary emission detectable by a detector during the broadcast period. A signal entrainment controller, in communication with the primary emitter and the secondary emitter, synchronizes the secondary emitter with the primary emitter to generate a resultant signal of higher intensity than the primary signal by itself.

Submerged optical communication ("opticom") systems must often operate in the presence of secondary lighting (e.g. from the illumination of a work site). In order to minimize the impact of the secondary lighting on detector performance (e.g. output deterioration from the detector), and increase the effective signal intensity reaching the detector, the current invention provides for entrainment of the light intensity from secondary light sources to the pattern of signals emanating from the opticom emitter. Entrainment causes the background signal produced from the secondary lighting to: (i) no longer be constant and (ii) become in effect, a secondary emitter, transmitting and reinforcing the same signal pattern as the primary emitter. Particularly benefited are those submergible opticom systems meant for operation in dark water which employ a detector that is negatively impacted (e.g. reduced signal to noise level) by the presence of a sustained background light.

The invention improves opticom transmission systems comprising signal detectors, also referred to as receivers, which are subject to output degradation from background signals within the amorphous broadcast medium. More specifically, the invention entrains specific sources of optical background signal to the output pattern of the primary signal emitter, thereby enhancing the signal reaching the detector positioned within the amorphous medium.

Suitable primary emitters can be any device capable of producing a signal to be transmitted through the broadcast medium to a detector, wherein the transmitted signal or the act of transmitting the signal can be used by a signal processor to entrain the output of a source of a background signal of the same modality. In preferred embodiments, the primary emitter is an LED or array of LEDs. In the most preferred embodiments the primary emitter emits light in the visible range, preferably encompassing wavelengths within the blue color range. The light may be a mixture of wavelengths such as white light or it may be monochromatic. The characteristics of the optical signal to be transmitted through the broadcast medium to the detector are those known to skilled practitioners and are exemplified by Farr et al. in U.S. Pat. No. 7,953,326, incorporated herein by reference.

The detector is selected for its compatibility with the emitter, and its ability to detect the signal emitted therefrom. In general, the detector will have the capability of converting received light originating from the emitter to an electrical output. In some cases the detector is a photomultiplier tube ("PMT"), or the like. PMTs are capable of sensing single photon events and their sensitivity can be controlled by changing the voltage used to power the tube. In the most preferred embodiments, the detector is a PMT designed with the largest angular reception possible so that it most preferably is capable of detecting emitted light arriving from at least a hemispherical area.

Detectors comprising PMT's may benefit most from the invention, since substitution of a steady state light beam from a secondary emitter with the inventive beam of fluctuating intensity will minimize corresponding gain reduction in the PMT, while at the same time enhancing the overall signal received due to signal reinforcement by the entrained secondary emitter signal.

Without entrainment, a non-modulated secondary light source behaves as a noise source to the detector leading to a reduction in the maximum operating range of the emitter-detector system. The degree to which range reduction actually occurs is dependent on the ratio of non-modulated to modulated light received. In a configuration where a receiver collects light from two optical sources of equivalent power where one is modulated and other non-modulated, there is the equivalent of an 8 dB decrease in power compared to the primary modulated source alone. Submerged opticom systems are most susceptible to deteriorated response when non-modulated sources are located near the receiver because the amount of received light can be many times greater than the power received from a remote transmitter. A typical illumination source located near the receiver can reduce overall link range by more than 97%. Use of the inventive entrained secondary emitters as compared to non-modulated secondary emitters are expected to improve the signal to noise level of the detector by at least 1 to 2%, preferably 1 to 5%, and in most embodiments 1-10%.

The secondary emitter produces a signal of the same modality (e.g. light) as the primary emitter. When in operation, the output of the secondary emitter is of a wavelength composition, and format that it can be detected by the detector and therefore is a potential source of background signal, noise or interference. Furthermore, if operated as a steady output (ie, as a non-entrained signal), the light from the secondary emitter, might lead to degradation of the performance/sensitivity of the detector. The inventive approach, however, reduces many or all of these negative effects of the secondary emitter on system performance.

In most instances the purpose of the secondary emitter is independent from that of the primary emitter. That is, while the primary emitter is intended to relay a signal to the detector for communication purposes, the secondary emitter is generally used to provide a lighting function. Typical lighting functions for a secondary emitter include: lighting a work site, illuminating a photographic target or subject, serving navigational purposes on a submersible vehicle, directional lighting, operating lights, a hand held light, a beacon, a work light, and a warning light.

In general, the emitted light from the secondary emitter will contain at least one wavelength capable of passing through the broadcast medium with an acceptable level of attenuation, such that it will travel the desired distance and arrive at the detector with an intensity that is detectable by the detector.

Light wave lengths between 400 and 500 nm pass through water with less attenuation than most other wavelengths and will generally be present in the emitted light. Most of the constituent wavelengths, when white light is passed through a long water path length, are more rapidly attenuated by the water than wavelengths in the 400 to 500 nm range. Therefore for the greatest optical telemetry range (e.g. 100 m-200 m), it is most efficient to use light comprising wavelengths in the 400-500 nm "window". For color imaging, which takes place at much shorter ranges (10m), white light is required.

An optical communications system when exposed to a non-modulated secondary light source undergoes a reduction in the maximum operating range due to a reduction in sensitivity of the detector. The range reduction is dependent on the ratio of non-modulated to modulated light received. Synchronizing or entraining a secondary light source to the primary emitter, has the opposite effect and increases operational range of the overall system.

To achieve effective entrainment, the secondary illumination source(s) preferably are synchronized to within 95% of the primary communications source. In a configuration where a receiver collects power from two optical sources of equivalent power synchronizing the second source adds approximately 4 dB to the primary signal for a total improvement of 6 dB. In two-emitter systems operating under optical conditions that would support a maximum range of 50 meters, entrainment will result in a range enhancement of at least 2, preferably 5, 10, 25, or up to 30 or 50 meters.

Suitable emitters (both primary and secondary) should be capable of rise and fall times of less than 1 microsecond, preferably less than 50 nanoseconds, more preferably less than 1 nanosecond, and ideally less than 10-100 picoseconds. Current LEDs operate in the greater than 100 picosecond range; to achieve rates of less than 100 picoseconds, laser-based emitters will generally be employed.

The combined circuitry elements of the secondary emitter must be capable of producing a modulating light beam synchronized to within 10 nanoseconds of the modulated beam of the primary emitters. Specifically, the circuitry will be assembled such that the entrained signal of the secondary emitter is substantially identical to that of the primary emitter with a following delay of no greater than 10-50 nanoseconds, preferably 1 nanosecond, and most preferably less than or equal to 100 picoseconds. The circuitry must also operate with less than 1 nanosecond of jitter.

Generally, information processing for the emitter and detector is accomplished through half-duplex multiplexing. The multiplexing frame rate is generally from 1 HZ to 5 Hz often 100-200 Hz, and in some embodiments up to 1000 Hz. In one embodiment, optimal optical performance of the detector is achieved by using light and secondary emitters that are synchronized to the primary emitter both in modulation rate and time division multiplexing.

In most embodiments, the primary and secondary emitters are approximately the same distance from the receiver or modem. System 10, FIG. 1, illustrates one construction of a system according to the present invention having a primary emitter P, a controller C, and a secondary emitter S that are immersed in an amorphous medium M and spaced from a receiver R, also referred to as detector R. Controller C has a first communication link $C_1$ with the primary emitter P and a second communication link $C_2$ with the secondary emitter S. In some constructions, at least one of links $C_1$ and $C_2$ is a wire that carries electrical signals; in other constructions, at least one of links $C_1$ and $C_2$ is a wireless communications link as is known by those of ordinary skill in the field. One known advantage of wireless communications is that it is generally easier to reconfigure wireless components of a system. Primary emitter P, which generates primary optical signals as indicated by arrows 20, is at a distance $D_1$ from receiver R and secondary emitter S, which generates secondary optical emissions as indicated by arrows 22, is at a distance $D_2$. As described in more detail below, in some constructions the primary emitter P and/or the receiver R are optical modems that are capable of both transmitting and receiving optical communication signals.

In certain preferred configurations, the distance $D_1$ of the primary emitter P to the receiver R is within 25 ft of the distance $D_2$ of the secondary emitter S to the receiver R; in other embodiments, the absolute value of $D_1$-$D_2$ is less than 20, 15, 10, or 5 feet. When observing such distance differentials is not possible, then in certain constructions a delay function is included in the circuitry of the controller or one or both emitters, in order to more effectively synchronize the signals reaching the detector (receiver R) by adjusting the actual emission timing of one or more emitters.

Effective transmission of optical data between the inventive emitters and detectors will vary in distance and rate depending on water clarity. In substantially clean water, the inventive emitter/detector systems will transmit up to110 meters at data rates of 2, 5, 8, 10, or 12 megabits/second. To achieve transmission distances of 200 meters in clean water transmission rates of less than 2, 1.5, 1.0, 0.75, or 0.5 Mbps will be needed.

Figure 2:
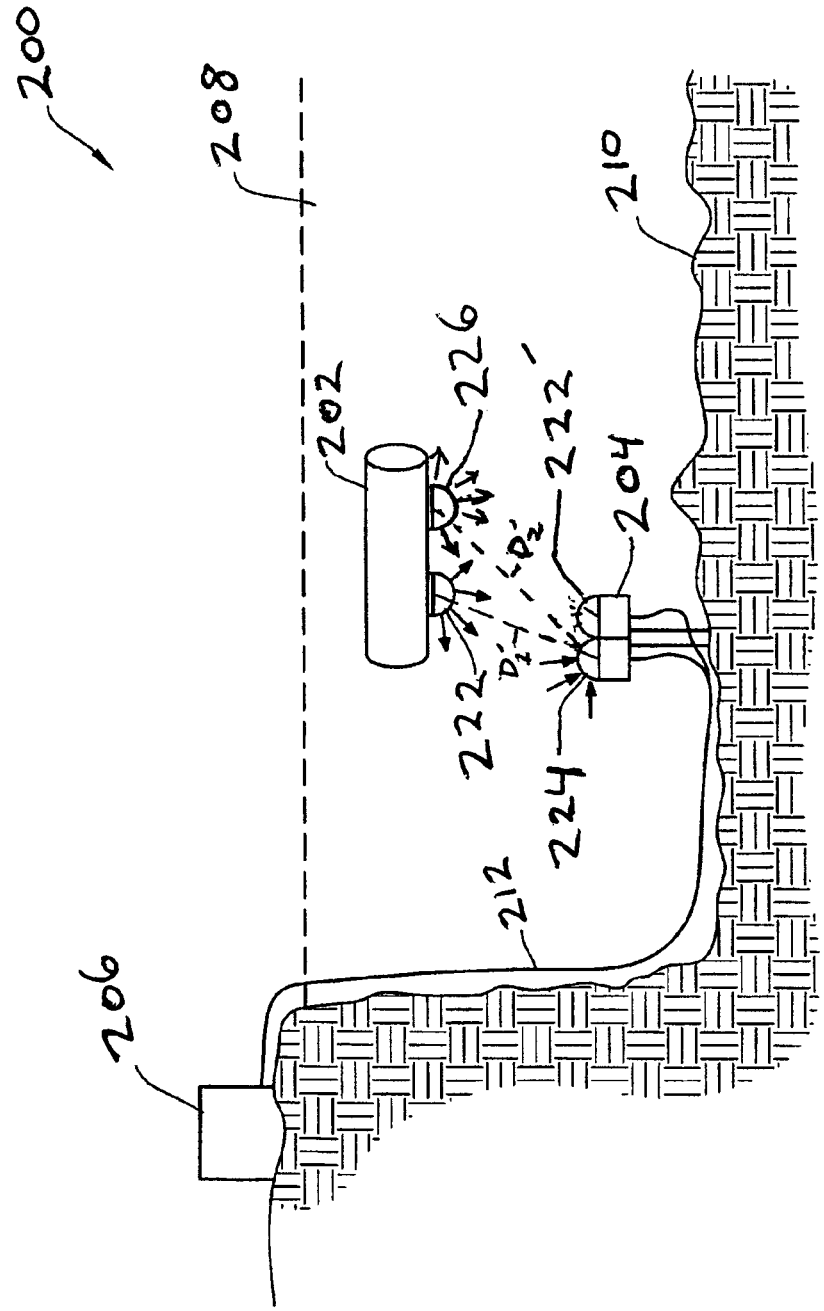
FIG. 2 is a schematic diagram of a system according to the invention carried by an underwater vehicle and in communication with a seafloor observatory.

System 200 according to the invention, FIG. 2, is carried by an underwater vehicle 202 that is in communication with a seafloor observatory 204 immersed in ocean 208 and positioned on seafloor 210. Vehicle 202 includes a primary transmitter 222 and a secondary emitter 226 such as an illumination light. In this construction, observatory 204 includes a receiver 224 and is connected by cable 212 with a land unit or station 206. As illustrated in FIG. 2, primary transmitter 222 is at distance $D_1'$ from receiver 224 and secondary emitter 226 is at distance $D_2'$. In some constructions, observatory 204 also includes a transmitter 222' and underwater vehicle 202 includes a receiver 225 as described in more detail below in relation to FIG. 5. Vehicle 202 communicates with cabled observatory 804 using a communication protocol, e.g., time division multiple access (TDMA), code division multiple axis (CDMA), space division multiple access (SDMA), frequency division multiple access (FDMA) or any other suitable communication protocol. The description of underwater unmanned vehicle 802 and seafloor observatory 804 by Farr et al. in U.S. Pat. No. 7,953,326 is expressly incorporated herein by reference.

Figure 3:
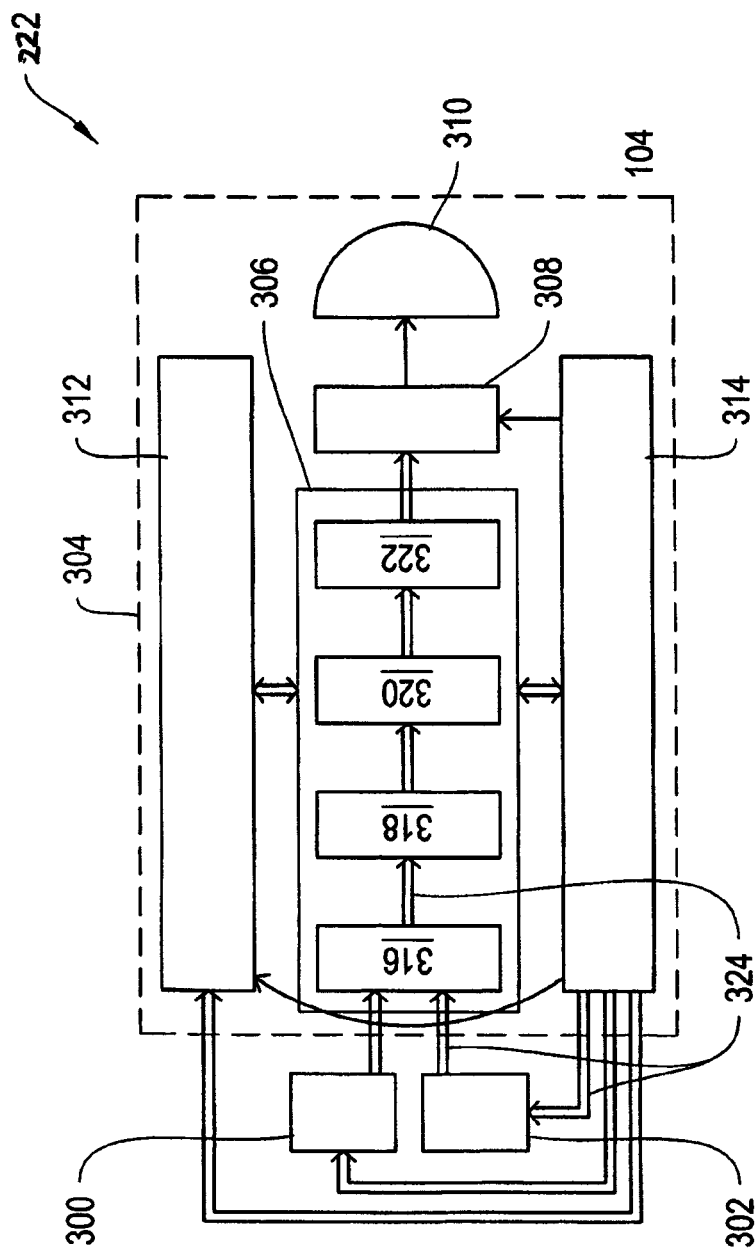
FIG. 3 is a more detailed block diagram of a primary emitter according to one embodiment of the invention.

FIG. 3 is a more detailed block diagram of a primary emitter 222 according to one embodiment of the invention connected to input devices including a data element 300 and a control element 302, which provide an input signal containing information to be transmitted. The primary emitter 222, also referred to as transmitter 222, includes a water-proof enclosure 304 that houses a microprocessor 306, an oscillator 308, a directional element 310, a memory 312 and a power supply 314. The microprocessor 306 includes a data interface module 316, a protocol/buffer module 318, a coding module 320 and a modulating module 322. Elements are electrically connected to each other by interconnect bus 324.

Figure 4:
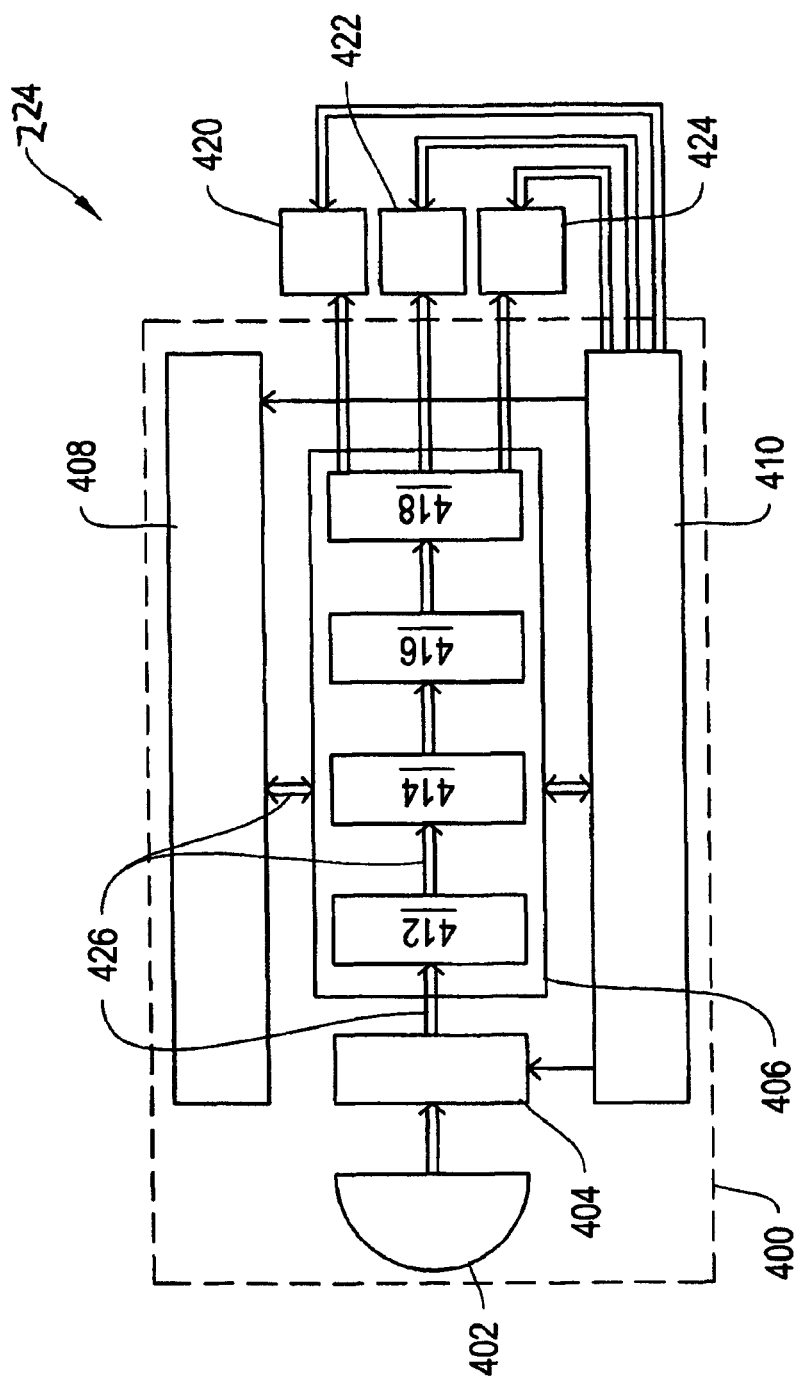
FIG. 4 is a more detailed block diagram of a receiver utilized according to one embodiment of the invention.

FIG. 4 is a more detailed block diagram of a receiver 224 utilized according to one embodiment of the invention having a waterproof enclosure 400 that houses a directional element 402, a detector 404, a microprocessor 406, a memory 408 and a power supply 410. The microprocessor 406 includes a demodulating module 412, a decoding module 414, a protocol/buffer module 416 and a device interface module 418. The receiver 224 is connected to output devices such as a computer 420, a data element 422, or an analog element 424. Components are electrically connected to each other by interconnect buses 426. The description of transmitter 102 and receiver 104 by Farr et al. in U.S. Pat. No. 7,953,326 is expressly incorporated herein by reference for transmitter 224 and receiver 224 for the present invention.

Figure 5:
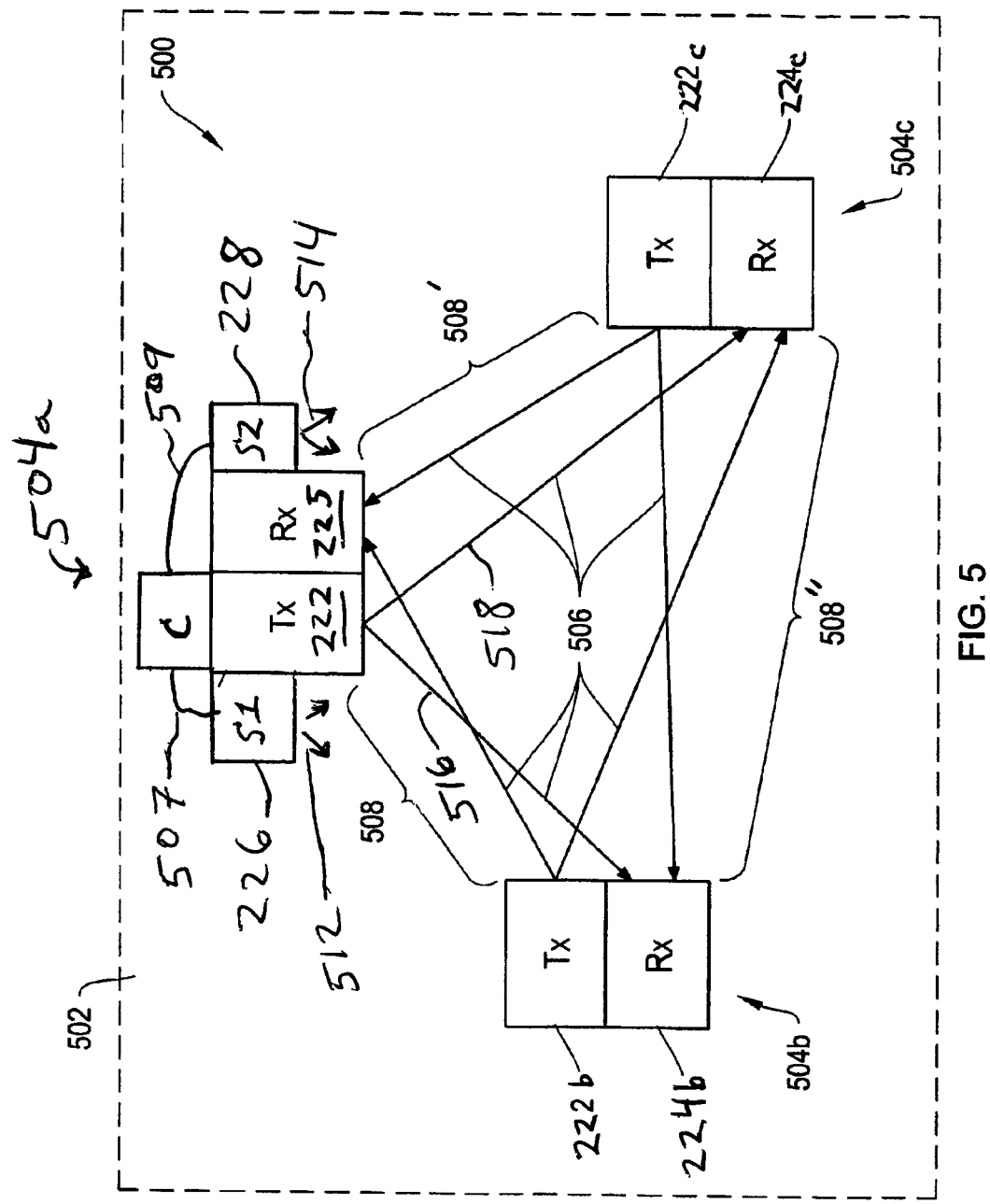
FIG. 5 depicts a network architecture for an underwater communication system according to one embodiment of the invention.

FIG. 5 depicts a network architecture of a network 500 according to the present invention within an underwater medium 502 including an underwater communication system 504a according to one embodiment of the invention communicating with optical modems 504b and 504c having transmitters Tx, components 222b and 222c, and receivers Rx, components 224b and 224c, respectively. In this construction, system 504a includes a transmitter Tx 222, a receiver Rx 225, secondary optical emitters S1 and S2, illustrated as light sources 226 and 228, respectively. A controller C synchronizes emissions 512 and 514 from emitters S1 and S2 with transmitter 222 via connections 507 and 509 so that enhanced optical signals 516 and 518 reach receivers 224b and 224c, respectively. The transmitters Tx and the receivers Rx send and receive information from each other along the direction of arrows 506. System 504a is separated by optical modems 504b and 504c by distances 508 and 508', respectively, while modems 504b and 504c are separated by distance 508".

In some constructions, at least one of system 504a, optical modem 504b, and optical modem 504c are mobile, and distances 508, 508' and/or 508" vary according to positioning of those units by one or more users, by currents within medium 502, or by other factors which alter their spatial relationships. In some embodiments, establishing the optical data connection between system 504a and units 504b and 504c includes determining acceptable optical ranges for distances 508, 508' and 508", respectively. In some embodiments, an optical communication network 500 is extended by disposing a third optical modem within an optical range of modem 504b, and disposing a fourth optical modem within an optical range of modem 504c.

The systems and methods described herein can be utilized to provide a reconfigurable, long-range, optical modem-based underwater communication network. In particular, the network provides a low power, low cost, and easy to deploy underwater optical communication system capable of being operated at long distances. Optical modem-based communication offers high data rate, and can be configured to generate omni-directional spatial communication in the visual spectrum. The omni-directional aspect of communication is advantageous because precise alignment of communication units may not be required. The optical modems may be deployed by unmanned underwater vehicles (UUVs) and physically connected by a tether (e.g., a light-weight fiber optic cable).

In one aspect, the systems and methods described herein provide for an underwater vehicle to establish an underwater optical communication link between a first cabled observatory 504b and a second cabled observatory 504c. The underwater vehicle carrying an optical communications system according to the present invention may include two optical modems, mechanically coupled by a tether. Each optical modem may include a transmitter having at least one optical source capable of emitting electromagnetic radiation of wavelength in the optical spectrum between about 300 nm to about 800 nm, and a diffuser capable of diffusing the electromagnetic radiation and disposed in a position surrounding a portion of the at least one source for diffusing the electromagnetic radiation in a plurality of directions. In some embodiments, the tether includes a fiber optic cable, copper cable, or any other suitable type of cable. In some embodiments, each optical modem includes at least two optical sources. A first optical source may be configured to emit electromagnetic radiation at a wavelength different from a second optical source.

The first and second cabled ocean observatories may be submerged under a water body at a desired depth, resting on a sea floor or suspended in the body of water. As referred to herein, the terms "cabled ocean observatory" and "cabled observatory" may be used interchangeably. The cabled ocean observatory may be designed around either a surface buoy or a submarine fiber optic/power cable connecting one or more seafloor nodes. In some embodiments, an underwater observatory maybe a stand-alone unit that is not connected to another communication unit by a tether or a cable. The stand-alone underwater observatory may include an independent power source such as a battery to operate independently. As referred to herein, the term "seafloor node" may refer to an underwater communication unit that includes an optical modem or any other suitable communication device. The observatory may also include sensors and optical imaging systems to measure and record ocean phenomena. A cabled observatory may be connected to a surface buoy, one or more seafloor nodes by a cable, a surface ship, or a station on land. In some embodiments, the cable includes a tether as described in further detail below. The cabled observatory may include an optical modem, which will be described in further detail below in reference to FIG. 5. In some embodiments, the optical modem is oriented with a hemispherical diffuser downwards. It should be understood that in some embodiments, the optical modem may be oriented upwards, sideways, or any other suitable direction. To avoid cross-talk among the plurality of modems, different collision avoidance protocols may be used, including TDMA, CDMA, FDMA, SDMA or any other suitable protocol as described above, as well as entraining secondary emissions according to the present invention. In addition, each modem may communicate on a plurality of optical channels, such as a different wavelength of electromagnetic radiation.

Figure 6:
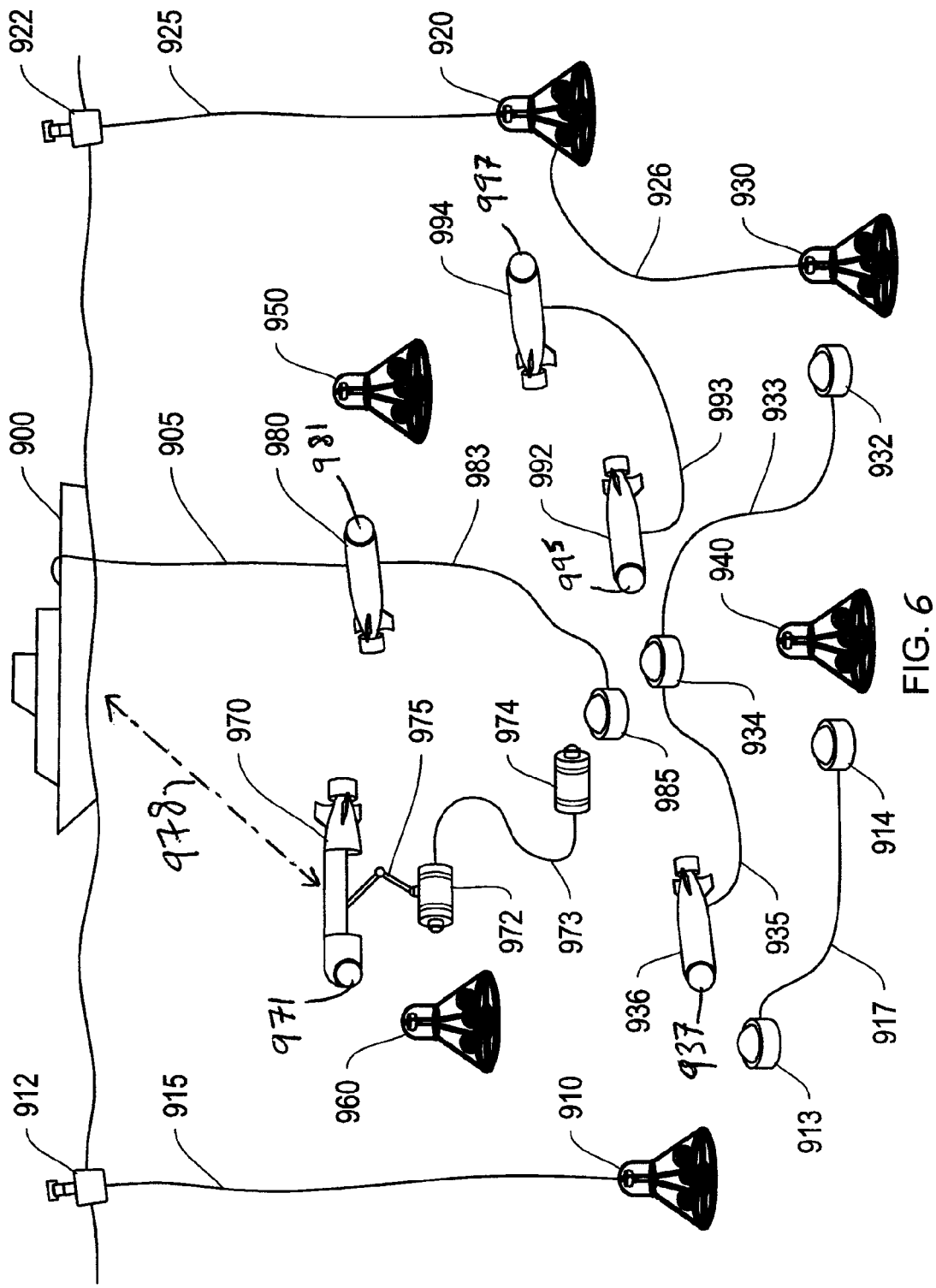
FIG. 6 illustrates an underwater optical communication network including a plurality of underwater optical modems and underwater vehicles according to an embodiment of the invention.

FIG. 6 illustrates an underwater optical communication network including a plurality of underwater optical modems, typically associated with underwater observatories, and underwater vehicles according to an embodiment of the invention. A plurality of underwater observatories 910, 920, 930, 940, 950 and 960, a plurality of stand-alone underwater optical modems 913, 914, 932, 934, 974, and 972, and a plurality of underwater vehicles 936, 970, 980, 992, 994 with secondary emission sources 937, 971, 981, 995 and 997, respectively. Also illustrated are various tethers 917, 933, 935, 973, 983, and 993 that mechanically couple various optical modems. Cables 905, 915, 925, and 926 are illustrated that may connect underwater observatories to one or more surface buoys 912 and 922, underwater observatories to other underwater observatories, or an underwater vehicle to a surface vessel 900. Additional communication techniques can be utilized such as acoustic transmissions 978 between underwater vehicle 970 and surface vessel 900.

Various configurations of underwater observatories and communication networks according to the present invention are depicted in FIG. 6. In a first configuration, a cabled underwater observatory 910 is connected via cable 915 to a surface buoy 912, which resides at the surface of the water. In a second configuration, a cabled underwater observatory 920 is connected via cable 925 to a surface buoy 912, which resides at the surface of the water. Cabled observatory 920 is connected via cable 926 to an underwater observatory 930. In a third embodiment, an underwater observatory may be a stand-alone unit, as illustrated by underwater observatory 940, 950 and 960.

An optical communication network may be established between the plurality of underwater observatories. Stand-alone underwater optical modem 913 may be disposed within an optical range of underwater observatory 910, and stand-alone underwater optical modem 914 may be disposed within an optical range of underwater observatory 940. A tether 917 may mechanically couple underwater optical modem 913 to underwater optical modem 914. underwater optical modem 913 and underwater optical modem 914 may be deployed using a UUV as described above in reference to FIG. 2.

The network may be extended to include a plurality of nodes. As referred to herein, the term "node" may be defined as an underwater optical modem that is part of an optical communication network. Underwater optical modem 932 may be deployed by a UUV 936 within an optical range of underwater observatory 930. Underwater optical modem 934 may also be deployed by UUV 936 at a location different from underwater optical modem 932 to facilitate connection to other underwater optical communication links. Underwater optical modem 934 may be mechanically coupled to underwater optical modem 932 by tether 933 and to UUV 936 by tether 935. UUV 936 may include an integrated optical modem that enables it to communicate with nodes in the optical communication network. For example, UUV 936 may navigate to a location within an optical range of underwater optical modem 913, and establish a an optical connection with underwater optical modem 913, thereby establishing an optical communication link between underwater observatories 910, 920, 930, and 940.

Faults in the underwater optical communication network may be repaired by reconfiguring nodes in the network. For example, a fault may be detected in tether 926, breaking the optical communication link between underwater observatory 920 and underwater observatory 930. To re-establishing an optical communication link between underwater observatory 920 and underwater observatory 930, optical modems may be deployed at nodes in the network that are connected to the underwater observatory 920 and underwater observatory 930. For example, UUV 994 and UUV 992 may each include an integrated optical modem that may be mechanically coupled to each other by tether 993. UUV 994 may navigate to and establish an optical connection with underwater observatory 920, and UUV 992 may navigate to and establish an optical connection with underwater optical modem 934. An optical communication link may be formed between underwater observatory 930 and underwater observatory 920 through UUV 992 and UUV 994. In some embodiments, each of UUV 992 and UUV 994 is configured to deploy an optical modem (not shown), that is mechanically coupled by a tether to an integrated optical modem. For example, UUV 992 may be configured to deploy a first optical modem that is mechanically coupled by a tether to an optical modem integrated with UUV 992, which is also mechanically coupled to the integrated optical modem of UUV 994 by a tether 993. In some embodiments, the UUV 994 is configured to deploy a second optical modem that is mechanically coupled by a tether to the integrated optical modem of UUV 994, and also mechanically coupled to the integrated optical modem of UUV 992, and the first optical modem that is deployable from UUV 992.

In some embodiments, optical connections may be formed to stand-alone underwater observatories. For example, UUV 980 may deploy underwater optical modem 985 within an optical range of underwater optical modem 934. UUV 980 may include an integrated optical modem and navigate to stand-alone underwater observatory 950. The integrated optical modem of UUV 980 may be mechanically coupled to underwater observatory 985 by tether 983. UUV may be connected to a surface ship 900 by a cable 905. The cable 905 may enable remote control of underwater vehicle 980.

In some embodiments, optical connections may be formed by deploying a set of stand-alone optical modems. For example, UUV 970 may deploy underwater optical modem 974 within an optical range of 985, and deploy underwater optical modem 972 within an optical range of stand-alone underwater observatory 960. In one construction, underwater optical modem 972 and underwater optical modem 974 are connected by physical tether 973.

As further illustrated in FIG. 6, a plurality of different nodes may connected in a linear or a non-linear arrangement. As referred to herein, the term "linear arrangement" may refer to a series of optical modems that may be connected in a non-branching chain. For example, the series of underwater optical modems 914, 913, 936, 934 and 932 may be considered a linear arrangement. As referred to herein, the term "non-linear" arrangement may refer to an arrangement of optical modems that include branches. For example, the collection of underwater optical modems 972, 974, 980, 985, 934 and 932 may form a branched arrangement that extend from underwater optical modems 934, 974 and 985 as a nexus.

Those skilled in the art will know or be able to ascertain using no more than routine experimentation, many equivalents to the embodiments and practices described herein. For example, the illustrative embodiments discuss the use of UUVs, but other underwater vehicles such as remotely operated vehicles (ROVs) and autonomous underwater vehicles (AUVs), as well as submersibles carrying one or more humans, may be used with the systems and methods described herein. Accordingly, it will be understood that the systems and methods described are not to be limited to the embodiments disclosed herein, but is to be understood from the following claims, which are to be interpreted as broadly as allowed under the law.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A system capable of operating in an amorphous medium to broadcast an optical signal through the amorphous medium to a remote detector capable of detecting the optical signal within the amorphous medium, the system comprising:
   a primary emitter, intended for communication purposes, capable of producing a primary communication optical signal having a first intensity during at least one broadcast period and capable of transmitting the primary optical signal through the amorphous medium;
   at least one secondary emitter separate from the primary emitter, generally used to provide lighting that is independent of the communication purposes of the primary emitter and in operation during at least a portion of the broadcast period, the secondary emitter being capable of producing a secondary emission having a second intensity detectable by the detector during the broadcast period; and
   a signal entrainment controller in communication with the primary emitter and the secondary emitter, wherein the signal entrainment controller synchronizes the secondary emitter with the primary emitter to generate a resultant signal of higher intensity within the amorphous medium than the intensity of the primary signal by itself.

2. The system of claim 1 wherein the controller modulates the second intensity of the secondary emitter in synchrony with the primary optical signal.

3. The system of claim 1 wherein the resultant signal is of higher intensity than either the intensities of the primary signal or the secondary signal alone.

4. The system of claim 1 wherein the primary optical signal and the secondary emission each have a timing, and the controller changes the timing of the secondary emission relative to primary optical signal to achieve substantially simultaneous reception by the detector of both signals.

5. The system of claim 1 wherein the amorphous medium includes water.

6. The system of claim 1 wherein the secondary emitter is normally operated at a duty cycle of at least 50 percent when activated.

7. The system of claim 1 wherein the secondary emitter is at least one of a work site light, a light to illuminate a photographic subject, a light on a submersible vehicle, a hand-held light, and a beacon.

8. The system of claim 1 wherein the controller includes at least one of a multiplexer and a signal splitter.

9. The system of claim 1 further including the remote detector, wherein the detector is capable of detecting at least the primary signal within the amorphous medium.

10. The system of claim 1 further including at least one receiver such that the system is capable of bidirectional communication with at least a third, remote emitter as well as the remote detector.

11. A method of broadcasting an optical signal through an amorphous medium, comprising:
    selecting a primary emitter intended for communication purposes and capable of producing a primary communication optical signal during at least one broadcast period;
    selecting a detector capable of detecting the primary signal within the amorphous medium;
    selecting at least one secondary emitter separate from the primary emitter to provide lighting that is independent of the communication purposes of the primary emitter and being capable of producing a secondary emission detectable by the detector during the broadcast period;
    producing a primary communication optical signal from the primary emitter during at least one broadcast period and transmitting the primary optical signal through the amorphous medium; and
    synchronizing the secondary emitter with the primary emitter, to generate a resultant signal of higher intensity than the primary signal by itself within the amorphous medium.

12. The method of claim 11 wherein synchronizing includes modulating the second intensity of the secondary emitter in synchrony with the primary optical signal.

13. The method of claim 11 wherein the primary optical signal and the secondary emission each have a timing, and synchronizing includes changing the timing of the secondary emission relative to primary optical signal to achieve substantially simultaneous reception by the detector of both signals.

14. The method of claim 11 wherein substantially real-time transmission of photographic images via the resultant signal is achieved.

15. The method of claim 11 further including selecting at least one receiver to accomplish bidirectional communication with at least a third, remote emitter as well as the remote detector.

16. The method of claim 15 wherein the secondary emitter is suppressed when the receiver senses that a remote emitter is transmitting an optical signal.

17. A system capable of operating in an amorphous medium to broadcast an optical signal through the amorphous medium to a remote detector capable of detecting the optical signal within the amorphous medium, the system comprising:
    a primary emitter capable of producing a primary optical signal having a first intensity during at least one broadcast period and capable of transmitting the primary optical signal through the amorphous medium;
    at least one secondary emitter separate from the primary emitter and in operation during at least a portion of the broadcast period, the secondary emitter being capable of producing a secondary emission having a second intensity detectable by the detector during the broadcast period;
    a signal entrainment controller in communication with the primary emitter and the secondary emitter, wherein the signal entrainment controller synchronizes the secondary emitter with the primary emitter to generate a resultant signal of higher intensity within the amorphous medium than the intensity of the primary signal by itself; and
    at least one receiver such that the system is capable of bidirectional communication with at least a third, remote emitter as well as the remote detector, wherein the secondary emitter is suppressed when the receiver senses that a remote emitter is transmitting an optical signal.

18. The system of claim 17 wherein the controller modulates the second intensity of the secondary emitter in synchrony with the primary optical signal.

19. The system of claim 17 wherein the resultant signal is of higher intensity than either the intensities of the primary signal or the secondary signal alone.

20. The system of claim 17 wherein the primary optical signal and the secondary emission each have a timing, and the controller changes the timing of the secondary emission relative to primary optical signal to achieve substantially simultaneous reception by the detector of both signals.

21. The system of claim 17 wherein the amorphous medium includes water.

22. The system of claim 17 wherein the secondary emitter is normally operated at a duty cycle of at least 50 percent when activated.

23. The system of claim 17 wherein the secondary emitter is at least one of a work site light, a light to illuminate a photographic subject, a light on a submersible vehicle, a hand-held light, and a beacon.

24. The system of claim 17 further including the remote detector, wherein the detector is capable of detecting at least the primary signal within the amorphous medium.

\* \* \* \* \*